Nov. 11, 1952  F. A. DION  2,617,425
AUXILIARY GRAIN SEPARATOR FOR COMBINES
Filed April 2, 1948  4 Sheets-Sheet 1

Inventor
Fred A. Dion
By Bacon + Thomas
Attorneys

Nov. 11, 1952          F. A. DION          2,617,425

AUXILIARY GRAIN SEPARATOR FOR COMBINES

Filed April 2, 1948          4 Sheets-Sheet 3

Inventor
Fred A. Dion
By Baron + Thomas
Attorneys

Nov. 11, 1952 — F. A. DION — 2,617,425
AUXILIARY GRAIN SEPARATOR FOR COMBINES
Filed April 2, 1948 — 4 Sheets-Sheet 4
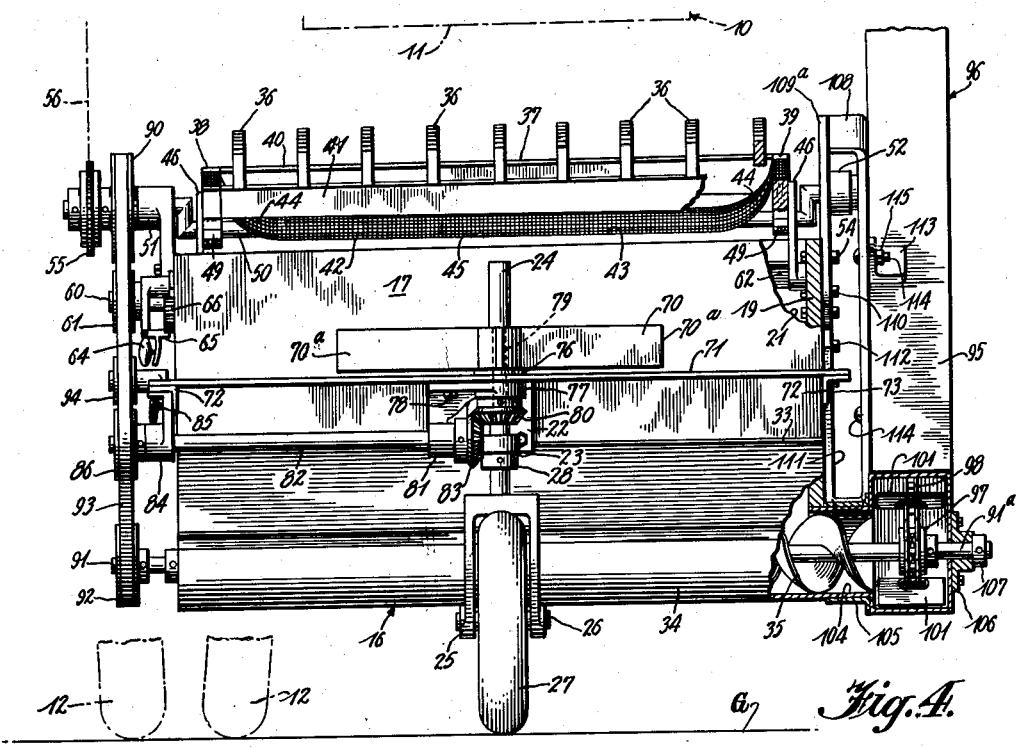
Fig. 4.
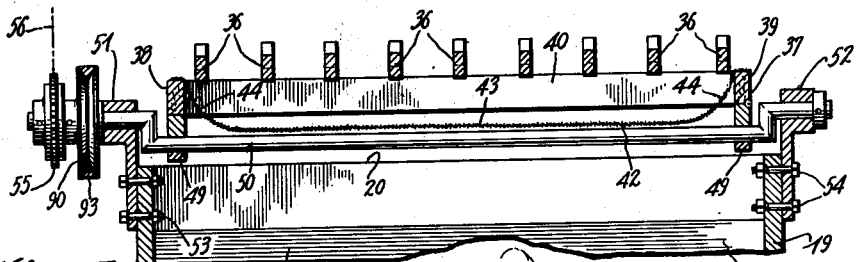
Fig. 5.
Fig. 6.
Inventor
Fred A. Dion
By Bacon + Thomas
Attorneys Patented Nov. 11, 1952

2,617,425

UNITED STATES PATENT OFFICE 2,617,425

AUXILIARY GRAIN SEPARATOR FOR COMBINES

Fred A. Dion, Havre, Mont.

Application April 2, 1948, Serial No. 18,685

5 Claims. (Cl. 130—24)

The present invention relates to grain saving equipment and more particularly to a grain separator adapted to be attached to and drawn by a harvester-thresher, or by a thresher alone, to save the grain lost by present-day threshers and discharged with the straw as waste on the field.

While efforts have been made heretofore to improve the speed and efficiency of operation of threshers and combined harvesters and threshers, the majority of present-day tractor-pulled, or self-propelled, commercial threshers must be operated at slow speed or in low gear, in order to afford ample time for the threshing of the wheat with a correspondingly slow fan speed to prevent the fan from blowing the grain out of the machine, together with the straw and other foreign matter. Notwithstanding, such slow, or low speed, operation, a substantial quantity of grain is discharged from conventional threshers with the straw and lost, the loss averaging about three or four bushels of grain per acre. However, considerable time can be saved by running such machines at higher speed, or in second gear, but this is impractical with most present-day machines, because it merely results in inefficient threshing and increased waste of grain which more than offsets the saving in time.

Accordingly, it is the principle object of this invention to provide an apparatus that will save the grain lost with present threshing machines and methods.

Another object of the invention is to provide means which will enable a thresher or harvester-thresher to operate in second gear without the loss of the grain normally wasted by operation at such speed, and to thus reduce the time required to effect threshing without loss of the grain.

Another object of the invention is to provide a grain separator adapted to be connected to and drawn by either a harvester-thresher, or a thresher alone, to save the grain normally lost in the use of such machines even when operating at slow or low speed.

Another object of the invention is to provide a grain separator with a reciprocating screen constructed so that no grain is lost by falling off the sides of the screen when the device is tilted due to being pulled along sloping terrain.

Still another object of the invention is to provide a grain separator adapted to receive the material discharged from the straw outlet of a conventional thresher in order to further treat such discharged material to separate the grain therefrom which is normally lost.

A further object of the invention is to provide a grain separator having an elevating conveyor adapted to have the discharge end thereof connected with the tailings conveyor, or other conveyor, of the main thresher so that the grain saved by the auxiliary thresher can be ultimately deposited in the grain tank of the main thresher without requiring separate handling.

Another object of the invention is to provide a grain separator with a conveyor that can be adjusted so that the grain separator can be used with various types of conventional main threshers.

A still further object of the invention is to provide a grain separator adapted to be connected with a conventional thresher and having a frame adapted to extend at least partially under the straw discharge hood of the conventional thresher in order that it may receive the material discharged from the main thresher and subject said material to further threshing action to save the grain which would otherwise be lost.

Still another object of the invention is to provide a grain separator adapted to have the front end thereof connected with a conventional thresher and having ground-engaging wheel means at the rear end thereof which is vertically adjustable to adapt the grain separator for use with conventional threshers having discharge outlets at different heights above the ground.

Other objects and features of the invention will be apparent from the following description taken in conjunction with the accompanying drawings, in which:

Fig. 4 is a rear elevation of the separator shown in Fig. 1 with some parts shown in cross-section;

Fig. 5 is a sectional view taken on the line 5—5 of Fig. 3 and particularly illustrating crank mechanism for shaking or reciprocating the separator screen and rake bars;

Fig. 6 is a diagrammatic view illustrating the manner in which the grain saved by the separator is returned to the main harvester-thresher; and Fig. 7 is a schematic view illustrating the manner in which the various elements of the grain separator may be driven by separate belts instead of by a single belt.

Figure 1:
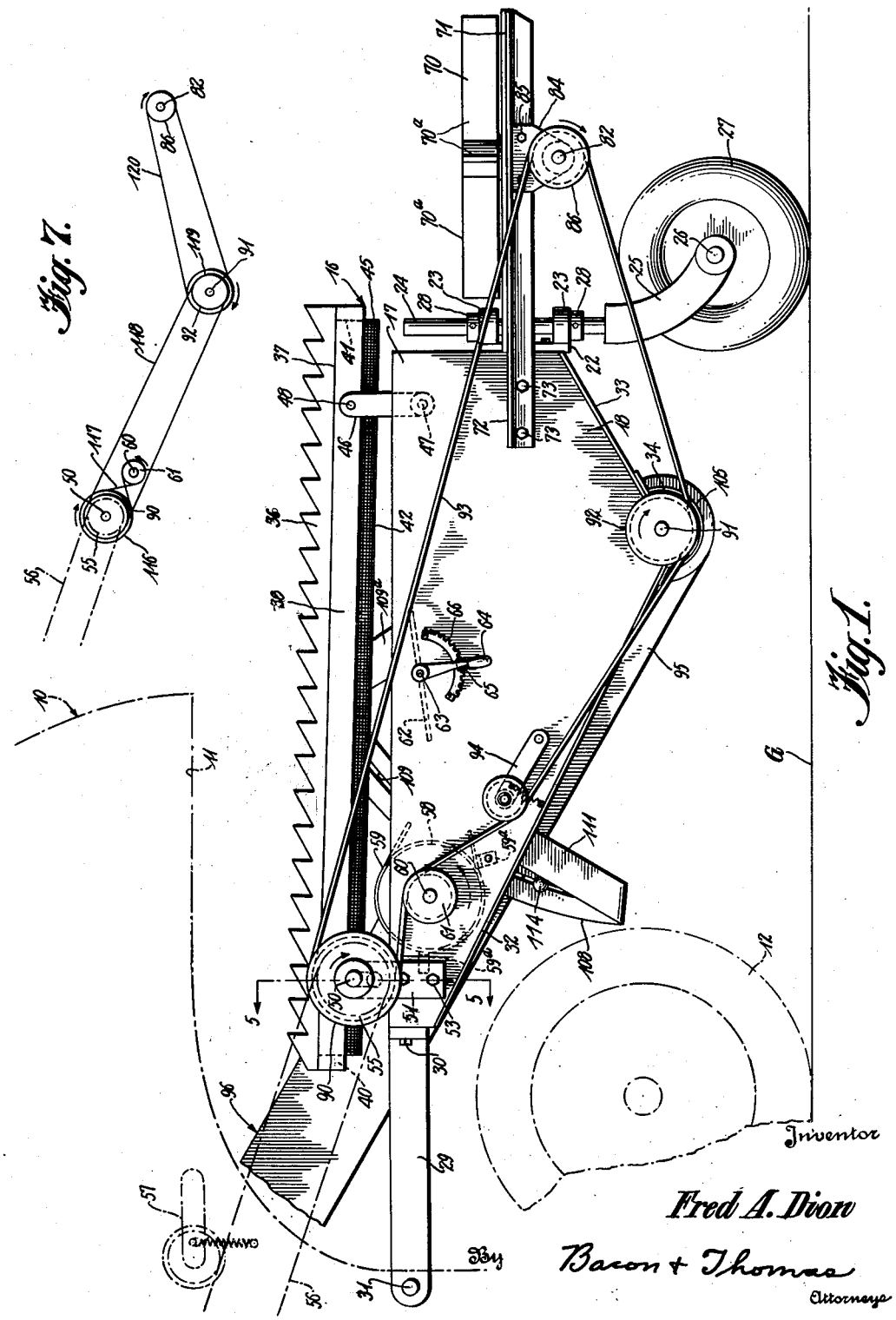
Fig. 1 is a right side elevation of a grain saver or separator embodying the principles of the present invention and illustrating the manner in which the same is adapted to be connected with one type of conventional harvester-thresher, a single belt being shown for driving the various elements of the grain separator.

Referring now to the drawings, a conventional harvester-thresher is generally identified by the numeral 10, and is shown in dot-and-dash lines. The thresher 10 includes a hood 11 which serves as a straw discharge outlet and a pair of rear steering wheels 12 offset to one side of said hood, as indicated in Fig. 4. The thresher 10 also includes a tailings conveyor 13 (Fig. 6) and an elevator 14 arranged to discharge cleaned grain into a grain tank 15.

The grain separator embodying the principles of the present invention is generally identified by the numeral 16 and includes a body providing a bin 17 comprising side walls 18 and 19 connected at one end by a transverse front wall 20 and at the other end by a transverse rear wall 21. A bracket 22 is securely mounted on the rear wall 21 and carries vertically spaced lugs 23, which rotatably receive the shank 24 of a fork 25 having a shaft 26 upon which a ground-engaging wheel 27 is rotatably mounted. The shank 24 is mounted for swivelling movement in the lugs 23 and carries adjustable collars 28 engaging the lugs 23 for effecting vertical adjustment of the wheel 27 with respect to the bin 17.

A pair of brackets 29 is secured at one end thereof to the front wall 20 by bolts 30. The opposite end of the brackets 29 is pivotally connected to the conventional thresher 10 by a transverse shaft or rod 31. While the brackets 29 and the shaft 31 have been disclosed herein as one operative means for connecting the grain separator 16 with the main thresher 10, it is to be understood that any other suitable means may be used in lieu thereof. It will also be understood that the height of the hood 11, or the straw discharge outlet of the main thresher, from the ground line G, varies in different makes of threshers and that the wheel 27 can be adjusted to raise or lower the rear end of the bin 17 to suit the particular thresher to which it is to be attached.

The bin 17 has a rearwardly sloping bottom wall portion 32 (Fig. 3), and a forwardly sloping bottom wall portion 33 which terminates short of the adjacent end of the wall portion 32. The gap between the bottom wall portions 32 and 33 provides a space for a screw conveyor housing 34 having an opening communicating with the interior of said bin. The housing 34 contains a conventional screw conveyor 35 for removing grain from the bin 17, as will be explained more fully hereinafter.

Figure 3:
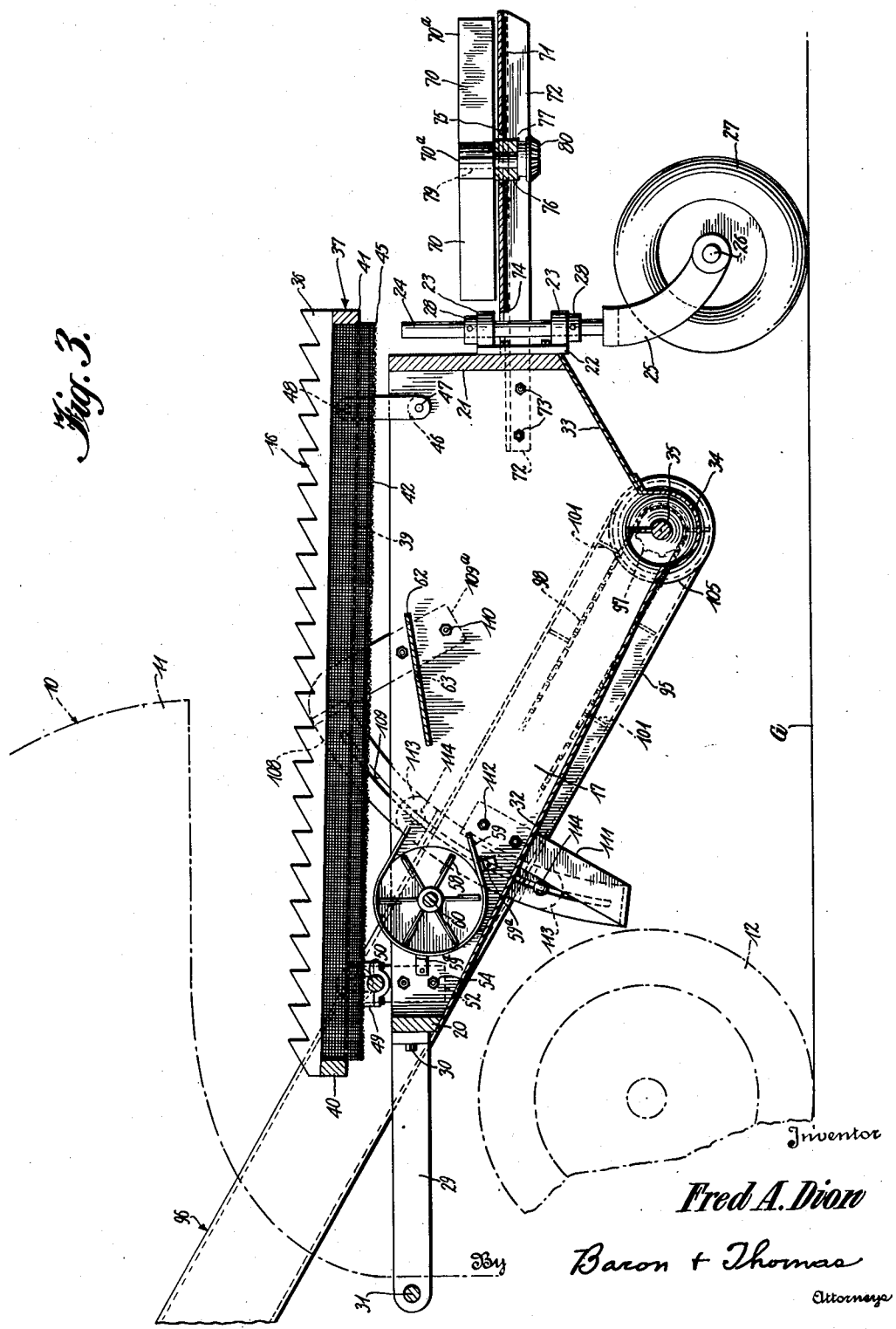
Fig. 3 is a sectional view through the separator taken on the line 3—3 of Fig. 2.

The straw, grain, etc. blown from the main thresher 10 through the hood 11 is deposited upon a plurality of parallel, toothed rake bars 36 mounted upon a rectangular grain separator frame 37. The frame 37 includes side members 38 and 39 and front and rear members 40 and 41. The frame 37 is greater in length than the bin 17 and the rake bars 36 are as long as said frame. The rake bars 36 are spaced four inches center to center and the ends thereof are secured to the front and rear frame members 40 and 41, respectively. The four-inch spacing of the rake bars will prevent even short pieces of straw from dropping down between the rake bars. A screen 42 is mounted in the frame 37 and is formed from perforated sheet metal or substantially rigid hardware cloth having openings sufficiently large to permit the grain to fall therethrough, but small enough to prevent foreign material of a size larger than the wheat grains from passing therethrough. The screen 42 extends from the end frame member 40 to the end frame member 41, as best shown in Fig. 3, and has a substantially flat bottom wall portion 43, as best shown in Fig. 4, and inclined, diverging side wall portions 44 which extend upwardly from said bottom wall portion for a height of about three to four inches. The edges of the side wall portions 44 are nailed or otherwise fastened to the upper surface of the frame side members 38 and 39, respectively. The inclined side wall portions 44 are purposely made of a substantial height in order to prevent any grain which has collected thereon from spilling over the sides of the screen and becoming lost when the device is being used on sloping terrain.

The frame 37 is mounted upon the bin 17 in a manner to provide for rapid shaking or reciprocation thereof. Thus, links 46 are pivotally mounted at the lower end thereof on pins 47 extending inwardly from the inner sides of the side walls 18 and 19 of the bin 17. The links 46 are pivotally connected at their upper ends with the side members 38 and 39 of the frame 37 by pins 48. Pillow blocks 49 are mounted on the underside of each of the frame side members 38 and 39 adjacent the forward end thereof, and these provide a bearing for the offset portion of a crankshaft 50. The ends of the crank 50 are rotatably mounted in bearing brackets 51 and 52, respectively, secured to the bin side walls 18 and 19 by bolts 53 and 54, as best shown in Fig. 5.

A sprocket wheel 55 is drivingly secured to one end of the crankshaft 50, and a chain 56 driven by a sprocket wheel (not shown) on the main thresher 10 transmits a drive to the sprocket 55. A conventional chain tightener 57 (Fig. 1) is arranged to maintain the chain 56 tight at all times and to take up any slack that might occur in said chain as a result of the grain separator 16 pivoting about the rod 31 as it is pulled over uneven ground.

It will be noted from Figs. 1, 3 and 6 of the drawings that the frame 37 overlies the bin 17 for its full length and that in use about half the length of the frame underlies the discharge hood 11 of the main thresher. As indicated in Fig. 4, the frame 37 is also substantially wider than the width of the discharge hood 11 so that all of the straw, etc. discharged from the hood 11 of the main thresher is deposited upon the rear end of the frame 37.

It will be apparent from the foregoing that as the sprocket 55 is rotated the crankshaft 50 will cause the rear end of the frame 37 to be raised and lowered and to be moved back and forth relative to the bin 17. In other words, the crankshaft 50 will impart a gyratory motion to the forward end of the frame 37, whereas the rear end of said frame will float back and forth with a more or less oscillatory movement on the links 46. The frame 37 and the rake bars 36 are reciprocated quite rapidly so that a continuous shaking and tossing of the straw occurs, with the teeth of the rake bars progressively moving the straw toward the rear end of the frame. This shaking action separates the grain from the straw, enabling the grain to drop down upon the screen 42. The forward end of the frame 37 is shown in its lowermost position in Fig. 3, but even in such position the screen 42 is slightly inclined downwardly toward the rear of said frame. Hence, any grain which drops upon the forward end of the screen 42 and does not immediately fall through the screen into the bin 17 is progressively moved toward the rear end of the screen until it does pass through one of the screen openings and falls into the bin 17. Any short pieces of straw, or other foreign matter, that drop onto the screen 42 are progressively moved toward the rear end 45 of the screen and eventually are discharged therefrom by the shaking action of the screen. It will be noted that the bottom wall portion 43 of the rear end 45 of the screen 42 is disposed below the rear frame member 41 so that foreign matter which has been deposited upon the screen is worked toward the rear end of said screen and discharged without hindrance.

Figure 2:
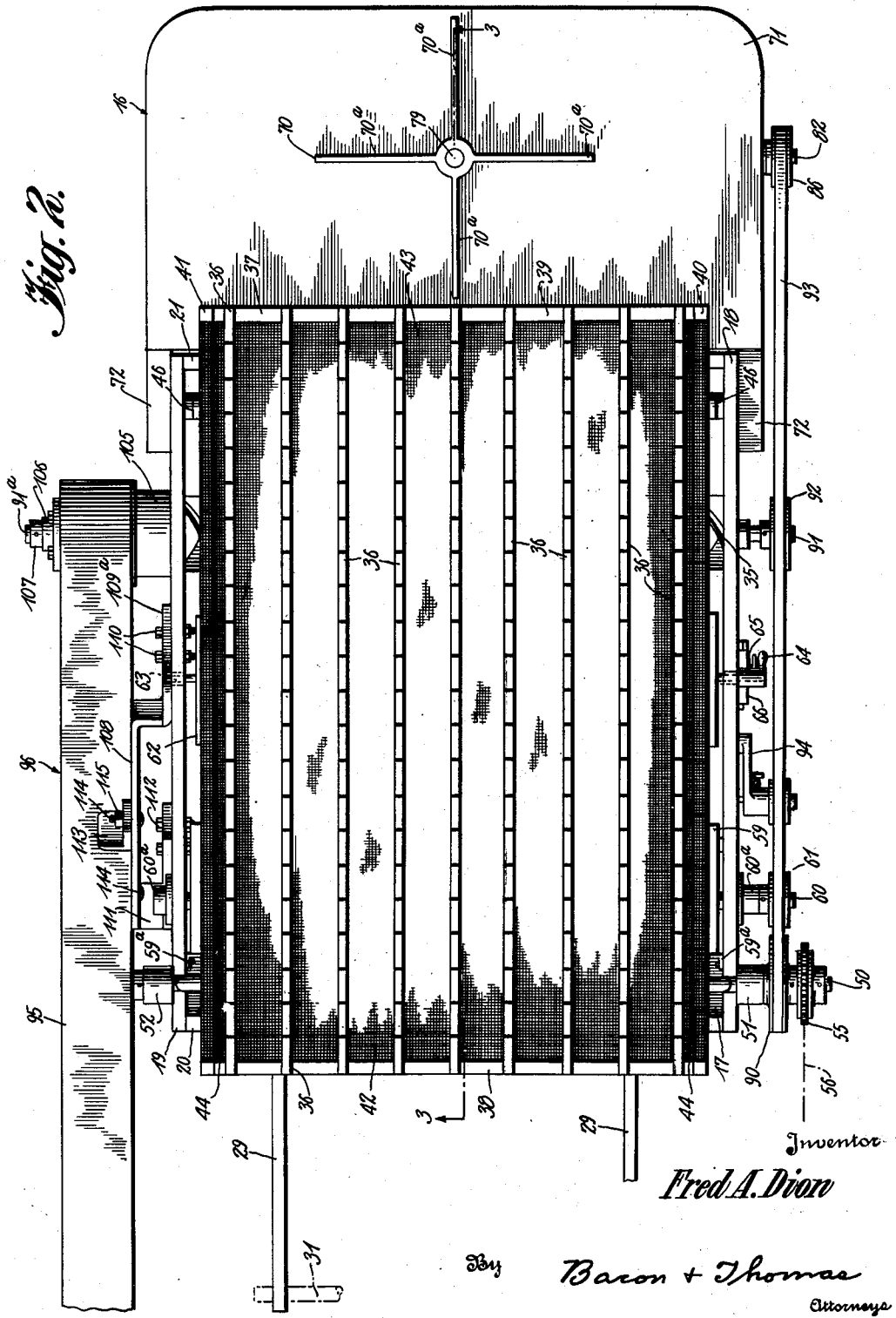
Fig. 2 is a plan view of the grain separator shown in Fig. 1.

The efficiency of the grain separator frame 37 is greatly improved by providing a continuously driven blower or fan 58 (Fig. 3) in the bin 17 adjacent the forward end thereof. The fan 58 is partially surrounded by a housing 59 suitably mounted between the bin side walls 18 and 19 on brackets 59ª. The fan 58 is mounted upon a shaft 60 journalled in bearings 60ª suitably secured to the bin side walls 18 and 19. A drive pulley 61 is mounted on the shaft 60 to effect driving of the fan 58. The fan housing 59 has an opening arranged to direct air upwardly and toward the rear end of the frame 37. The fan 58 provides a stream of air extending for the full width of the screen 42 and this stream is quite effective for blowing thistle or other light foreign matter off the screen 42 without blowing away the grain. The stream of air from the fan 58 can be deflected or directed as desired by a windboard 62 disposed in the path of said air stream. The windboard 62 extends across the bin 17 for substantially the full width of said bin and is mounted on a shaft 63 for pivotal movement relative to the fan 58. The windboard 62 can be adjusted to any desired angle by an arm 64 (Figs. 1, 2 and 4) having a conventional spring-pressed detent 65 cooperating with a toothed segment 66 carried by the bin side wall 18, for locking the windboard 62 in any desired position of angular adjustment for the most effective operation.

The straw and other foreign matter discharged from the rake bars 36 and the screen 42 are scattered or distributed over the ground as the grain separator moves forwardly by a spreader wheel 70 having four arms 70ª. The spreader wheel 70 is disposed above a horizontal platform 71, which has sections of angle iron 72 welded or otherwise secured thereto at each side of the bin 17. The sections of angle iron 72 are of a length sufficient to overlap the sides 18 and 19 of the bin and are rigidly secured thereto by bolts 73. The platform 71 is provided with a recess 74 (Fig. 3) to clear the bracket 22 and the shank 24 of the trailer wheel 27. The platform 71 also has an opening 75 adapted to receive the portion 76 of a bracket 77 which is secured to the underside of the platform 71 by bolts 78 (Fig. 4). A shaft 79 extends through the bracket portion 76 and has a bevel gear 80 secured to the lower end thereof. The hub of the spreader wheel 70 is also secured to the shaft 79 to be driven thereby. The bracket 77 also includes a portion 81 which serves as a bearing for one end of a transverse shaft 82. A bevel gear 83 is secured to the shaft 82 and meshes with the bevel gear 80. The outer end of the shaft 82 is rotatably mounted in a bracket 84 secured by bolts 85 to one of the angle iron sections 72. A drive pulley 86 is mounted on the shaft 82 outwardly of the bracket 84.

The crankshaft 50 has a pulley 90 mounted thereon inwardly of the sprocket 55. The screw conveyor 35 has a shaft portion 91 which extends outwardly of the side wall 18 and has a pulley 92 mounted thereon. The fan drive pulley 61 and the spreader wheel drive pulley 86, previously referred to, are disposed in a common plane with the pulleys 90 and 92 so that all can be driven by a single V-belt 93. The belt 93 is maintained tight at all times by a conventional spring-actuated belt tightener 94.

The grain which drops through the screen 42 into the bin 17 slides down the bottom wall portions 32 and 33 by gravity into the screw conveyor housing 34. The screw conveyor 35 conveys this grain toward the bin side wall 19 and discharges the same into the housing 95 (Fig. 4) of an elevating conveyor 96. The conveyor 96 includes a sprocket 97 mounted on an extension 91ª of the screw conveyor 35, a chain 98 and an idler sprocket 99 (Fig. 6) at the discharge opening 100 of the housing 95. The chain 98 carries blades 101, which move the grain deposited in the housing 95 upwardly toward the discharge opening 100. The discharge opening 100 may be connected by a flexible conduit or fabric sleeve 102 with an inlet 103 of the tailings conveyor 13 of the main thresher 10. Thus, in operation, the screw conveyor 35 will deliver the grain separated from the straw by the frame 37 to the conveyor 96, which in turn conveys it to the tailings conveyor 13 for ultimate delivery to the grain storage tank 15.

In order to adapt the grain separator 16 for use with various types of main threshers, the conveyor housing 95 is pivotally mounted upon an extended cylindrical portion 104 of the screw conveyor housing 34, as best shown in Fig. 4. Thus, a flanged ring 105 is welded or otherwise secured to the conveyor housing 95 and surrounds the cylindrical portion 104 of the screw conveyor housing 34, thereby providing a broad bearing for the lower end of the housing 95. The shaft portion 91 is supported in a bearing 106 carried by the housing 95 and a collar 107 is secured to the shaft portion 91ª to maintain the housing 95 in pivotal assembled relation with the screw conveyor housing 34. Thus, the housing 95 can be angularly adjusted about the axis of the screw conveyor 35.

In order to maintain the housing 95 in the desired position of angular adjustment with respect to the bin 17, a bracket 108 is provided having an arcuate slot 109 concentric with the axis of the screw conveyor 35. The bracket 108 has an offset end 109ª secured to the bin side wall 19 by bolts 110 and a reversely bent end 111 which is secured to said side wall by bolts 112. The housing 95 has lugs 113 welded or otherwise secured to the narrow sides of the housing 95, and a carriage bolt 114 extends through the slot 109 and through each of the lugs 113. A nut 115 threaded on each of the carriage bolts 114 is adapted to be tightened to firmly secure the conveyor housing 95 to the bracket 108 in any desired position of adjustment within the limits of the slot 109.

While a single belt 93 has been shown for driving the pulleys 90, 86, 92 and 61, it is apparent that these pulleys may be driven through more than one belt. While the use of a plurality of belts necessitates the use of additional pulleys, nevertheless, such a plural belt drive is contemplated and diagrammatically illustrated in Fig. 7. Thus, in Fig. 7, the crankshaft 50, in addition to having the sprocket wheel 55 and the pulley 90 mounted thereon, has a pulley 116 secured thereto. A cross belt 117 is arranged to drive the fan pulley 61 from the pulley 116, and a belt 118 is arranged to drive the screw conveyor pulley 92 from the pulley 90. A pulley 119 is mounted on the shaft 91 adjacent the pulley 92 and drives the spreader wheel pulley 86 through a belt 120. The various belts and pulleys shown in Fig. 7 may, of course, be driven from the main thresher 10 through the chain 56, as shown.

It will be understood that the grain thresher 16 described herein may be provided with ball bearings throughout to minimize friction and that in lieu of employing a single belt drive 93, additional belts and pulleys may be employed for effecting the same operation, as schematically shown in Fig. 7.

It will be apparent from the foregoing that the grain separator 16 provides an apparatus for saving grain which would otherwise be lost, and includes conveyor means for conveying the saved grain back to the main thresher so that the saved grain does not require separate handling.

Another important feature of the present invention is that it enables a greater wind pressure in the conventional main combine thresher 10 to be maintained for more effective cleaning, because if any grain is blown over with the straw, thistles, etc., from the main thresher, the grain separator will separate the two. The present invention also makes it economically practicable to operate the main thresher 10 at a higher speed than low because it will remove any grain carried over with the straw due to the increased speed. In this manner, the present invention not only saves grain but also can be utilized to save threshing time.

While a preferred form of the invention has been illustrated and described herein in detail, it will be understood that changes may be made in the arrangement and design of the parts and in the manner in which the various elements are driven, without departing from the spirit of the invention or the scope of the annexed claims.

I claim:

1. A grain separator, comprising: a bin; a grain separator frame disposed above said bin and including a pair of side members and end members; a plurality of longitudinally extending rake bars mounted upon said end members of said grain separator frame; a mesh screen carried by said grain separator frame below said rake bars, said screen including a flat bottom portion extending for substantially the full width of said grain separator frame and having upwardly diverging integral mesh screen side wall portions of substantial height extending from said bottom portion and secured to the side members of said grain separator frame, said side wall portions of said screen serving to prevent grain from dropping off the sides of said screen when the grain separator is tilted while employed on sloping terrain; and means for reciprocating said grain separator frame relative to said bin.

2. In a separator, a frame including a pair of side members and end members; a plurality of longitudinally extending rake bars mounted upon said frame; and a mesh screen carried by said frame, said screen including a generally flat bottom wall portion extending for the major portion of the width of said frame and having longitudinally extending integral mesh screen side wall portions of substantial height diverging upwardly from said bottom wall portion and secured to the side members of said frame, said longitudinal side wall portions of said screen serving to prevent grain from dropping off the sides of said screen when the separator is tilted while employed on sloping terrain.

3. A grain separator, comprising: a bin; a substantially rectangular frame of greater length than said bin disposed above said bin and including a pair of longitudinal side members and transverse end members; a plurality of longitudinally extending rake bars of greater length than said bin mounted upon said end members of said frame; a mesh screen of greater length than said bin carried by said frame and disposed below and in spaced relation to said rake bars and end members, said screen including a flat bottom portion extending transversely for the major portion of the width of said frame and having upwardly extending integral mesh screen side wall portions of substantial height extending from said flat bottom portion and secured to the side members of said frame, said side wall portions of said screen serving to prevent grain from dropping off the sides of said screen when the grain separator is employed on sloping terrain; and means for reciprocating said frame relative to said bin.

4. A grain separator, comprising: a bin adapted to have the front end thereof connected with a conventional thresher; wheel means supporting the rear end of said bin; a frame disposed above said bin adapted to receive the straw, etc., discharged from a conventional thresher, said frame comprising a pair of longitudinal side members and transverse end members; a plurality of longitudinally extending rake bars of greater length than said bin mounted upon said end members; a mesh screen of greater length than said bin carried by said frame and disposed below and in spaced relation to said rake bars and at least the rearmost end member, said screen including a bottom portion and integral mesh screen side portions extending upwardly from said bottom portion and secured to said frame; means pivotally supporting the rear end of said frame above said bin; means supporting the front end of said frame above said bin and for imparting reciprocating motion thereto; a spreader wheel disposed at the discharge end of said frame and adapted to have the straw and other foreign matter discharged thereinto from the rear end of said screen and rake bars; and means for simultaneously driving said reciprocating means and said spreader wheel.

5. A grain saving device for use with a thresher having a tailings conveyor and a downwardly directed straw discharge outlet, comprising: a bin; a grain separator frame of greater length than said bin disposed above said bin; rake bars mounted upon said frame; a screen carried by said frame and disposed below said rake bars, said rake bars and said screen respectively being of greater length than said bin so that the ends thereof normally project beyond the ends of said bin; means for supporting and reciprocating said frame on said bin; a fan in said bin disposed below said screen for blowing air upwardly through said screen while said screen is being reciprocated; a windboard in said bin on the discharge side of said fan arranged to direct air from said fan toward said screen; a screw conveyor in said bin for conveying grain out of said bin; conveyor means for conveying said grain back to the tailings conveyor of said thresher; and means for connecting said bin with said thresher in a position such that the material from the discharge outlet of said thresher is deposited directly upon said rake bars and screen.

FRED A. DION.

REFERENCES CITED

The following references are of record in the file of this patent:

UNITED STATES PATENTS

| Number | Name | Date |
|---|---|---|
| 267,549 | Lott | Nov. 14, 1882 |
| 318,865 | Burgess | May 26, 1885 |
| 798,956 | Good | Sept. 5, 1905 |
| 1,007,297 | Lattimer | Oct. 31, 1911 |
| 1,197,293 | Hutton | Sept. 5, 1916 |
| 1,210,571 | Welty | Jan. 2, 1917 |
| 1,534,560 | Curtis | Apr. 21, 1925 |
| 1,835,327 | Paradise | Dec. 8, 1931 |
| 1,868,237 | Judson | July 19, 1932 |
| 2,255,193 | Steelman | Sept. 9, 1941 |
| 2,280,677 | Wagner et al. | Apr. 21, 1942 |
| 2,297,998 | Dray | Oct. 6, 1942 |

FOREIGN PATENTS

| Number | Country | Date |
|---|---|---|
| 666,937 | France | June 3, 1929 |